No. 830,662. PATENTED SEPT. 11, 1906.
H. A. H. GUHL.
DEVICE FOR SHARPENING LEAD AND OTHER PENCILS.
APPLICATION FILED JULY 14, 1905.
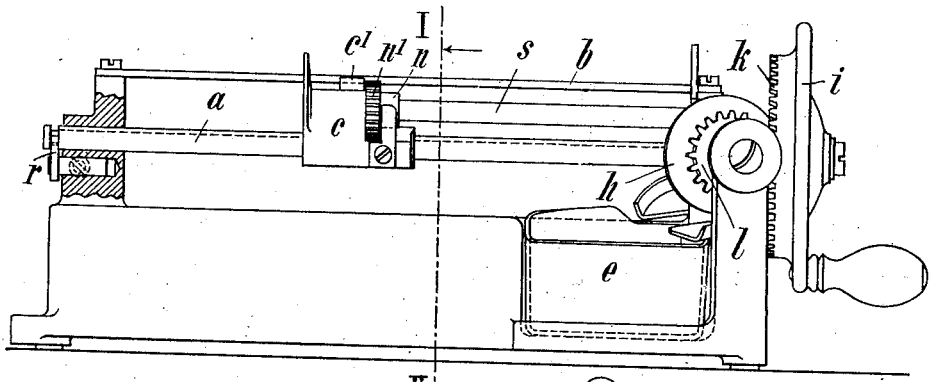
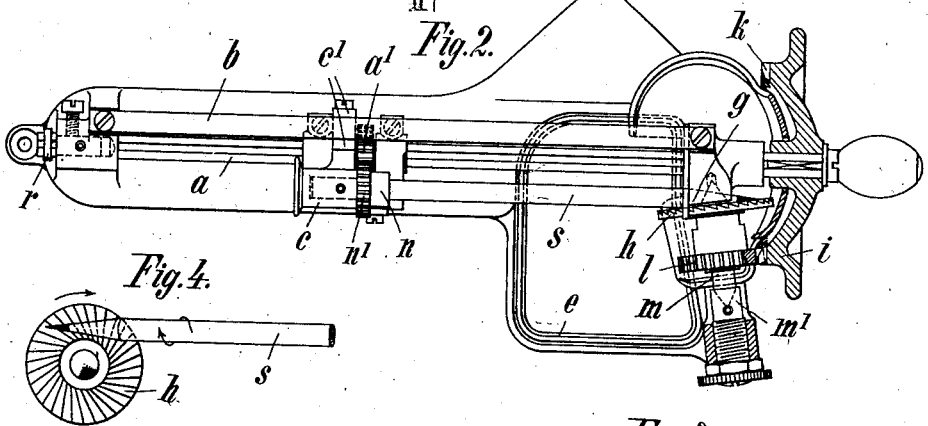
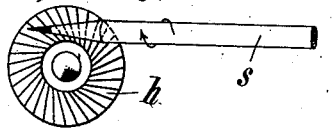
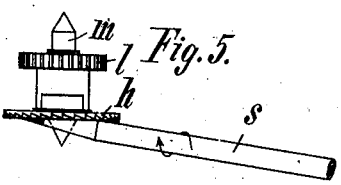
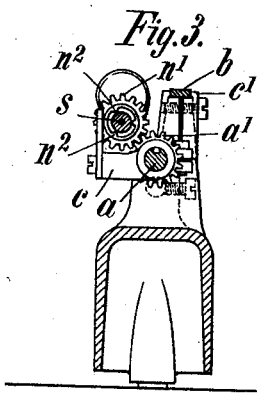
Witnesses
H. L. Amer.
R. Dommers
Inventor.
Heinrich August Hermann Guhl.
by Henry Orth Jr.
atty.

UNITED STATES PATENT OFFICE.

HEINRICH AUGUST HERMANN GUHL, OF HAMBURG, GERMANY.

DEVICE FOR SHARPENING LEAD AND OTHER PENCILS.

No. 830,662.  Specification of Letters Patent.  Patented Sept. 11, 1906.

Application filed July 14, 1905. Serial No. 269,653.

*To all whom it may concern:*

Be it known that I, HEINRICH AUGUST HERMANN GUHL, a subject of the German Emperor, and a resident of Hamburg, in the German Empire, have invented certain new and useful Improvements in Devices for Sharpening Lead and other Pencils, of which the following is a specification.

This invention relates to a machine for sharpening lead and slate pencils and crayons by means of rotary disk cutters, for which purpose a chuck having a conical interior for the end of the pencil to be sharpened is arranged adjacent the cutter and allows the end of the rotating pencil which is to be sharpened to pass through a lateral slot in the same, so as to come under the action of the cutter-blades. Heretofore in such a chuck the end of the pencil has been so arranged that the pressure of the teeth or blades of the cutter acting on the end of the pencil could not, it is true, break the end of the pencil, but by means of the drawing cut of the blades toward the point of the pencil a tearing away of the pencil end was not impossible, because the chuck does not exert a sufficient protective counter-action in this direction. Under the present invention this drawback is avoided by arranging a cutter adjacent the chuck with the blades of the cutter so set to the chuck that their cut takes place against the end of the pencil, which is able to resist the same by means of its being mounted in the chuck. Since, then, only pressure effects take place on the end of the pencil, and as these effects are taken up by the chuck, there is created a most advantageous combination of the chuck and the cutter.

In the accompanying sheet of drawings, Figure 1 is a longitudinal elevation, and Fig. 2 a plan, partly in section, of a sharpening device constructed in accordance with and embodying my invention. Fig. 3 is a cross-section of the device on the line I II, Fig. 1. Figs. 4 and 5 are detailed views of the cutter and a pencil to be sharpened.

Similar letters refer to similar parts throughout the several figures.

The shaft $a$ of the machine is mounted in a frame and is provided with a hand-wheel $i$ or the like, and said shaft engages through a crown-wheel $k$ a pinion $l$ on a spindle $m$, carrying the interchangeable cutter $h$ and mounted between center points. Axially slidable on the shaft $a$ is a carriage $c$, fitted with a chuck or tubular guide $n$, which carriage carries a pinion $n'$, engaging a pinion $a'$, carried on the shaft $a$ and secured by a feather and groove, while it can slide with the carriage on the said shaft. For guiding the carriage $c$ a rail $b$ is provided, which rail engages with an arm $c'$ of the sliding carriage.

The two ends of the pencil $s$ which is to be sharpened are placed in the chuck $n$ and guide $g$, and by turning the hand-wheel the chuck $n$ and the cutter $h$ are rotated, sharp ribs in the chuck constraining the pencil to rotate therewith. Through the aforesaid slot in the front internally-conical chuck or guide $g$ the end of the rotating pencil $s$ to be sharpened is passed into the range of the cutting-blades which sharpen the pencil. While being sharpened the pencil must be moved forward a little with gentle pressure, for which purpose the pressure of the finger on the carriage is sufficient.

The cutting edges or cutting-teeth of the cutter are preferably inclined or set at an angle to the radii of the cutting-disk, whereby even cutting and taking away of the splinters or shavings is obtained.

For the reception of the fine splinters and dust there can be arranged at the side beneath the cutter a small removable pan $e$.

Having fully described my invention, what I claim, and desire to secure by Letters Patent, is—

1. In a pencil-sharpening machine, the combination with a conical, laterally-slotted guide-socket for the pencil ends to be sharpened, and means for rotating the pencil in said socket, and simultaneously permit the advancement thereof, of a cutter-disk mounted adjacent to said socket to cut the pencil along the slot said cutter-disk having blades whose edges are at an acute angle to the radii of said disk and mechanism to rotate the disk to sweep the slot from its forward end rearward, substantially as described.

2. In a pencil-sharpening machine the combination with a conical, laterally-slotted guide-socket for the pencil end to be sharpened, and means for holding the opposite end of the pencil, of gearing to rotate said means and slidable therewith along the shaft, said shaft driving the gearing, a cutter-disk having cutting-blades in its face at an acute angle to the radii of the disk, means to simultaneously rotate the shaft and disk, said blades operating on the pencil projecting from the slot and cutting from the point of the rear, during the rotation of the pencil, substantially as described.

HEINRICH AUGUST HERMANN GUHL.

Witnesses:
MAX LEMCKE,
ERNEST H. L. MUMMENHOFF.